United States Patent
Komai et al.

(10) Patent No.: US 6,379,611 B1
(45) Date of Patent: Apr. 30, 2002

(54) HIGH STRENGTH, LOW ALLOY, HEAT RESISTANT STEEL

(75) Inventors: Nobuyoshi Komai; Fujimitsu Masuyama, both of Nagasaki; Tomomitsu Yokoyama, Tokyo; Hiroyuki Hirata; Kaori Kawano, both of Neyagawa; Takao Kan, Amagasaki, all of (JP)

(73) Assignees: Sumitomo Metal Industries, Ltd., Osaka; Mitsubishi Heavy Industries, Ltd., Chiyoda-Ku, both of (JP)

( * ) Notice: Subject to any disclaimer, the term of this patent is extended or adjusted under 35 U.S.C. 154(b) by 0 days.

(21) Appl. No.: 09/641,683

(22) Filed: Aug. 18, 2000

(30) Foreign Application Priority Data

Aug. 18, 1999 (JP) .............................. 11-231972
Jul. 27, 2000 (JP) ........................ 2000-226955

(51) Int. Cl.$^7$ ..................... C22C 38/22; C22C 38/24; C22C 38/26; C22C 38/38
(52) U.S. Cl. ................. 420/106; 420/108; 420/109; 420/110; 148/334; 148/335
(58) Field of Search ................. 420/106, 108, 420/109, 110; 148/334, 335

(56) References Cited

U.S. PATENT DOCUMENTS 5,746,843 A * 5/1998 Miyata et al. .............. 148/335

FOREIGN PATENT DOCUMENTS

| EP | 0560375 | 9/1993 |
|---|---|---|
| JP | 58164752 | 9/1983 |
| JP | 59-80755 | 5/1985 |
| JP | 4-268040 | 9/1992 |
| JP | 5-345949 | 12/1993 |
| JP | 08225884 | 9/1996 |
| JP | 8-325669 | 12/1996 |
| JP | 2659813 B2 | 9/1997 |
| JP | 10-008194 | 1/1998 |
| JP | 11123553 | 5/1999 |

* cited by examiner

Primary Examiner—Deborah Yee
(74) Attorney, Agent, or Firm—Burns, Doane, Swecker & Mathis, LLP

(57) ABSTRACT

A high strength, low alloy, heat resistant steel having excellent weldability has an average crystal grain diameter of at most 110 μm and consists essentially of, by mass %: C: 0.03–0.15%, Si: at most 1%, Mn: at most 2%, P: at most 0.03%, S: at most 0.03%, Ni: at most 0.5%, Cu: at most 0.5%, Cr: 1.8–2.8%, V: 0.1–0.3%, Nb: 0.01–0.08%, Mo: 0.05–0.35%, W: 1.2–1.8%, Ti: 0.001–0.05%, B: 0–0.02%, Al: at most 0.1%, O: at most 0.1%, N: in an amount satisfying the formula $[\%N] \leq [\%Ti] + 5[\%B] + 0.004$, and a remainder of unavoidable impurities.

11 Claims, 4 Drawing Sheets

HIGH STRENGTH, LOW ALLOY, HEAT RESISTANT STEEL

BACKGROUND OF THE INVENTION

1. Field of the Invention

This invention relates to a high strength, low alloy, heat resistant steel which has excellent resistance to heat treatment cracks, i.e., it has a low susceptibility to cracks formed in welded joints during heat treatment after welding.

2. Description of the Related Art

Examples of well-known high temperature materials for use in heat resistant and pressure resistant piping for boilers, chemical equipment, and similar devices include low alloy, heat resistant steels containing a few % of Cr, high Cr ferritic heat resistant steels containing 9–12% of Cr, and austenitic stainless steels typified by 18% Cr-8% Ni steel. Of these materials, low alloy, heat resistant steel typified by 2.25% Cr-1% Mo steel (a so-called 2¼% Cr-1% Mo steel) is inexpensive, so it is used in large quantities.

Low alloy, heat resistant steels containing a few % of Cr typically have a ferrite texture such as tempered bainite or tempered martensite. Compared to high Cr heat resistant steels and steels with an austenitic texture, their high temperature strength is low. For this reason, in recent years, there have been numerous proposals for improving the high temperature strength of low alloy, heat resistant steels by adding Mo, W, Nb, V, and other alloying element to a low alloy steel.

For example, Japanese Patent No. 2659813 discloses a steel which contains Cr: 0.7–3%, Mo: 0.3–1.5%, V: 0.05–0.35%, Nb: 0.01–0.12%, and N: 0.01–0.05%, and which is further adjusted to contain W: 0.5–2.4%, B: 0.0005–0.015%, Al: at most 0.1%, and Ti: 0.05–0.2%. The steel is heated to a temperature of at least 1100° C. and is then cooled to room temperature, plastic working is carried out at room temperature or during working or during cooling in a temperature range in which recrystallization will not take place, and finally normalizing at a temperature lower than 1100° C. and tempering at not higher than the $A_{C1}$ temperature are carried out to manufacture a steel in which the degree of softening of weld heat affected zones is lessened and in which the impact properties of the base material are improved and which can be used at a temperature up to approximately 600° C.

Japanese Published Unexamined Patent Application Kokai Hei 4-268040 discloses a low alloy, heat resistant steel having excellent creep strength and toughness and which contains Cr: 1.5–3.5%, W: 1–3%, V: 0.1–0.35%, Nb: 0.01–0.1%, B: 0.0001–0.02%, N: less than 0.005%, Al: less than 0.005%, and Ti: 0.001–0.1%, and if necessary further contains one or more of La, Ce, Y, Ca, Zr, and Ta each in an amount of 0.01–0.2% and Mg in an amount of 0.0005–0.05%, and further contains Mo: 0.01–0.4%, with the amounts of Ti and N satisfying the formula:

$$0.080 \geq Ti(\%) - (48/14)N(\%) \geq 0.003.$$

Japanese Published Unexamined Patent Application Kokai Hei 5-345949 discloses a low Cr ferritic heat resistant steel having excellent toughness and creep strength which includes Cr: 1.5–3.5%, W: 1.0–3.0%, V: 0.10–0.35%, Nb: 0.01–0.10%, B: 0.0001–0.02%, N: less than 0.005%, Al: less than 0.005%, Ti: at least 0.001% and less than 0.050%, Cu: 0.10–2.50%, and if necessary contains Mo: 0.01–0.40% and one or more of La, Ce, Y, Ca, Zr, and Ta each in an amount of 0.01–0.20% and Mg in an amount of 0.0005–0.05%, and among impurities, P: at most 0.03%, and S: at most 0.015%.

This steel has a high creep strength, so the N content and the Al content are limited to less than 0.005%, and Ti is added to fix N, and B is added. In addition, in order to improve the toughness of welds, Ti, Cu, and W are added. Cu is added in order to improve oxidation resistance and corrosion resistance, while V, Nb, and W are added to improve strength.

Japanese Published Unexamined Patent Application Kokai Hei 8-325669 discloses an ultra-low Mn, low Cr ferritic heat resistant steel having excellent high temperature strength which contains Cr: 0.8–3.5%, W: 0.01–3.0%, V: 0.1–0.5%, Nb: 0.01–0.20%, Al: 0.001–0.05%, Mg: 0.0005–0.05%, B: 0.0020–0.02%, N: less than 0.005%, P: at most 0.03%, and S: at most 0.015%, and if necessary contains Mo: 0.01–1.5%, and one or more of La, Ce, Y, Ca, and Ta each in an amount of 0.01–0.2%, and a remainder of Fe and unavoidable impurities, wherein the B content satisfies the formula:

$$(14/11)B > N - N(V/51)/\{(C/12)+(N/14)\} - N(Nb/93)/\{(C/12)+(N/14)\}.$$

In this steel, W is added to improve high temperature creep strength, the amount of Mn is limited to less than 0.1% in order to suppress a decrease in the effect of W after long periods of use, and B is added to prevent a decrease in strength and toughness and to increase high temperature creep strength. In order to guarantee the effectiveness of B, the amount of B is controlled by the above formula relating N, V, C, and Nb.

Japanese Published Unexamined Patent Application Kokai Hei 10-8194 discloses a ferritic steel having excellent weldability and high temperature strength which includes Cr: 0.3–1.5%, W: 0.1–3%, V: 0.01–0.5%, Nb: 0.01–0.2%, Al: 0.001–0.05%, B: 0.0001–0.02%, N: 0.001–0.03%, P: at most 0.025%, and S: at most 0.015%, if necessary one or more of Mo: 0.01–3%, Ca, Ti, Zr, Y, La, Ce, and Ta each in an amount of 0.01–0.2% and Mg in an amount of 0.0005–0.05%.

This steel is a low Cr ferritic steel which can be used in place of a high Cr ferritic steel and which has improved high temperature creep strength at a temperature of at least 450° C. and which has performance comparable to or better than that of existing low alloy steels with respect to toughness, workability, and weldability.

When performing welding with low alloy, heat resistant steels like those described above, there is the problem that weld metal cold cracks develop. In order to prevent weld metal cold cracks, it is typical to perform preheating before welding and then to perform heat treatment after welding. However, as described on pages 10, 22–23, 100, and 150 of "Standards for Heat Treatment after Welding and their Explanation" (Japan High Pressure Technology Organization, edited by the Stress and Annealing Working Group, published by Nikkan Industrial Newspaper on Sep. 26, 1994), it is known that cracks develop in the weld heat affected zone of these low alloy, heat resistant steels during heat treatment after welding, i.e., they have a high susceptibility to heat treatment cracks. Heat treatment cracks are produced by a different mechanism from weld metal cold cracks, so they cannot be prevented by control of the preheating temperature.

Many reports have been published concerning heat treatment cracks in low alloy, heat resistant steels. For example, a heat treatment crack susceptibility index ($P_{SR}$) is proposed in Journal of Welding Academy, Volume 41 (1972), No. 1, page 59. For a Cr content in the range of at most 1.5%, the heat treatment crack susceptibility index increases with increases in the amounts of Cr, Cu, Mo, V, Nb, and Ti. In particular, V, Nb, and Ti have a large effect on the index. In addition, Journal of Welding Academy, Volume 49, (1980), No. 3, page 203 discloses that the heat treatment crack susceptibility index increases as the amounts of the impurities P, Sb, Sn, and As increase in steel. Furthermore, Japanese Published Unexamined Patent Application Kokai Sho 59-80755 proposes a low alloy, heat resistant steel having excellent resistance to temper brittleness.

SUMMARY OF THE INVENTION

Each of the above-described publications concerning heat treatment cracks relates to a steel which does not contain W. As a result of studies by the present inventors, it became clear that in the case of a steel containing W, the strength at high temperatures is high, so the susceptibility to heat treatment cracking is markedly increased.

In the publications listed above, except for Japanese Published Unexamined Patent Applications Kokai Hei 4-268040 and Kokai Hei 5-345949, there is no description concerning welding cracks. In Japanese Published Unexamined Patent Applications Kokai Hei 4-268040 and Kokai Hei 5-345949, there is a description concerning prevention of weld metal cold cracks by control of the preheating temperature, but there is no mention concerning heat treatment cracking, which is a big problem with respect to steels containing W. Namely, at present, a high strength, heat resistant steel containing W and having adequate resistance to heat treatment cracking has not been obtained.

It is an object of the present invention to provide a Cr-Mo type high strength, low alloy, heat resistant steel which contains W and which has excellent resistance to heat treatment cracking.

The present inventors welded low alloy, heat resistant steels containing W and then investigated in detail the cracks which were generated in subsequent heat treatment (referred to below as post weld heat treatment). As a result, it was found that cracks are generated in heat affected zones where crystal grains are coarsened during post weld heat treatment at a temperature near the liquidus line. When the form of the fracture was observed with a scanning electron microscope, molten spots (cracks accompanying the formation of a liquid phase) were not found in the fracture, and as a result of analysis, a marked concentration of N on the fracture was found. Furthermore, as a result of observation with an electron microscope, it was found that minute carbides of V and Nb were generated within grains in the vicinity of cracks.

From these results, it was thought that weld heat treatment cracking is a phenomenon in which cracks open up due to the combined effects of factors such as the following:

(i) grain boundary segregation of N is accelerated by post weld heat treatment, and intercrystalline bonding strength is decreased, (ii) due to precipitation hardening caused by carbides of V and Nb and solid solution hardening by W, the interior of grains is strengthened, and (iii) deformation caused by thermal stresses is concentrated on the smooth surface of crystal grains which are coarsened due to welding heat cycles.

As a result of these observations, it was found that weld heat treatment cracks can be prevented by adjusting the form in which N is present by use of Ti and B. Namely, since Ti and B have a strong affinity for N, they form stable nitrides with N to decrease the amount of free N present at grain boundaries, the free N having the problem that it decreases intercrystalline bonding strength.

Ti generates TiN mainly at grain boundaries at the time of manufacture of steel, and due to the pinning effect, it suppresses coarsening of crystal grains caused by welding heat cycles. In order for this effect to be adequately exhibited, it is necessary for the amount of Ti to be at least 0.001%.

B has a strong tendency to segregate, so B which does not combine with N exists at grain boundaries as free B and occupies segregation sites. It thereby suppresses the segregation of N and other grain boundary weakening elements and increases intercrystalline bonding strength. As a result, it can contribute to the prevention of weld heat treatment cracks.

Figure 5:
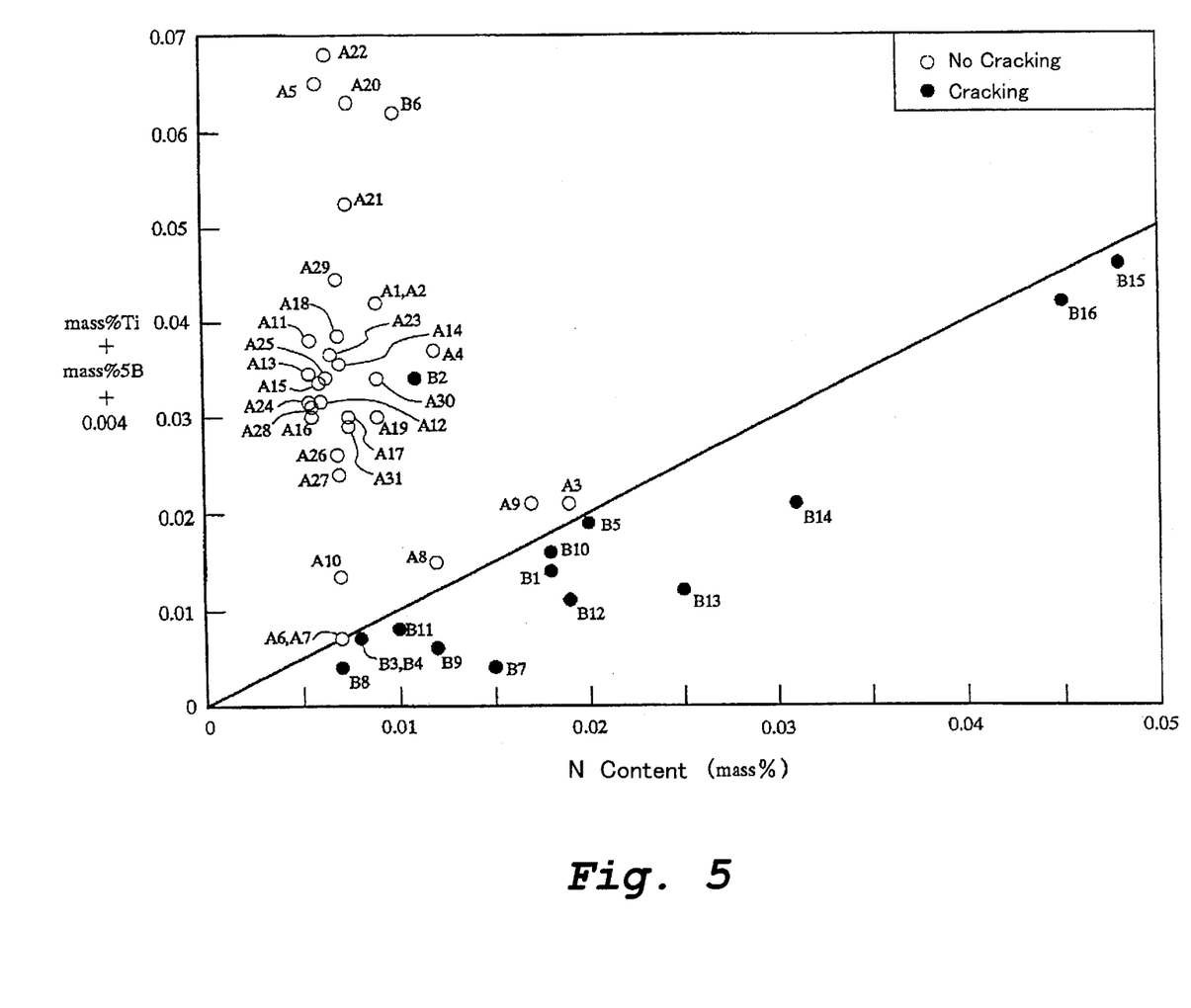
FIG. 5 is a graph of the relationship between N content and ([%Ti]+5[%B]+0.004) in examples of the steel according to the present invention and in comparative examples.

The effects of Ti and B in preventing cracks is of course strongly influenced by the amount of N, which is an intergranular embrittling element. When a large amount of N is present in a steel, large amounts of Ti and B are necessary to prevent cracks. FIG. 5, which was obtained using data from the below-described examples, illustrates the relationship between the amount of N present in a steel, relative to the amounts of Ti and B, and the occurrence of heat treatment cracks. In the figure, the abscissa is the N content [%N] of a steel according to the present invention or a comparative example, and the ordinate is the value of [%Ti]+5[%B]+0.004 for the steel. Steels in which there were no heat treatment cracks are indicated by an open circle (○), and steels in which cracks occurred are indicated by a solid circle (●). From this figure, it is ascertained that weld heat treatment cracks can be prevented, if the relationship between the N content [%N] and ([%Ti]+5[%B]+0.004) satisfies the following formula (1):

$$[\%N] \leq [\%Ti] + 5[\%B] + 0.004 \tag{1}$$

However, if the average crystal grain diameter in the heat affected zone exceeds 150 μm, even if the above formula (1) is satisfied, the generation of weld heat treatment cracks cannot be prevented. In order to restrict the average crystal grain diameter in the weld heat affected zone to at most 150 μm, the average crystal grain diameter of the base material must be at most 110 μm.

Accordingly, the present invention provides a low alloy, heat resistant steel with excellent weldability which has an average crystal grain diameter of at most 110 μm and consists essentially of, in mass %:

C: 0.03–0.15%, Si: at most 1%, Mn: at most 2%, P: at most 0.03%, S: at most 0.03%, Ni: at most 0.5%, Cu: at most 0.5%, Cr: 1.8–2.8%, V: 0.1–0.3%, Nb: 0.01–0.08%, Mo: 0.05–0.35%, W: 1.2–1.8%, Ti: 0.001–0.05%, B: 0–0.02%, Al: at most 0.1%; O: at most 0.1%, N: in an amount satisfying the formula $$[\%N] \leq [\%Ti] + 5[\%B] + 0.004 \tag{1}$$

and a remainder of unavoidable impurities,

The average crystal grain diameter of the steel can be determined by counting the number of crystal grains present in an arbitrary length in a photograph taken using a microscope, and then dividing the length by the number of crystal grains.

DESCRIPTION OF PREFERRED EMBODIMENTS

Next, the effects of each chemical component of a steel according to the present invention and the reasons for the ranges thereof will be described. Unless otherwise specified, % of chemical components refers to mass %.

C: 0.03–0.15%

C forms carbides in steel and contributes to an increase in high temperature strength. In addition, it functions as an austenite forming element, and it suppresses the formation of δ ferrite. For this reason, the amount of C must be at least 0.03%. However, excessive addition thereof increases the hardness of weld heat affected zones and increases the susceptibility to weld metal cold cracks and to heat treatment cracks after welding. In addition, a steel with a high C content becomes brittle when used for long periods at high temperatures. For these reasons, the upper limit on the C content is 0.15% and preferably is 0.12%.

Si: at most 1%

Si is added as a deoxidizing element during steel manufacture. It is also effective for improving the oxidation resistance and resistance to high temperature corrosion of steel. However, it leads to a decrease in toughness of steel during extended use at high temperatures. For this reason, the upper limit on the Si content is 1%, and preferably is 0.8%. The lower limit may be the level of unavoidable impurities, but in order to guarantee the deoxidizing effect, it is preferably at least 0.05%.

Mn: at most 2%

In the same manner as Si, Mn is added to perform deoxidation at the time of steel manufacture. However, if too much is added, it leads to a decrease in strength during extended use at high temperatures and a decrease in toughness. For this reason, the Mn content is at most 2%, preferably it is at most 1.5%, and more preferably it is less than 0.35%. The lower limit may be the level of unavoidable impurities, but in order to guarantee the deoxidation effect, it is preferably at least 0.05%.

P: at most 0.03%

P is present in steel as an unavoidable impurity. If the content thereof is high, weld heat treatment cracks are generated. Therefore, the P content is at most 0.03% The amount of P is preferably as low as possible, and there is no particular lower limit thereon, but extreme lowering of the P content leads to an increase in manufacturing costs, so from a practical standpoint, the lower limit is generally on the order of 0.0005%.

S: at most 0.03%

Like P, S is present in steel as an unavoidable impurity. If it is contained in large amounts, it generates weld heat treatment cracks. For this reason, the S content is at most 0.03%. The amount of S is preferably as low as possible, so there is no particular lower limit thereon. However, as is the case with P, from the standpoint of refining costs, the lower limit is generally on the order of 0.0005%.

Ni: at most 0.5%

Ni is an austenite forming element. It suppresses the formation of δ ferrite phase, and it guarantees the stability of texture, so it may be added. When it is added, the content thereof is preferably at least 0.01%. However, excessive addition thereof decreases ductility during use at high temperatures, so the upper limit on the Ni content is 0.5%.

Cu: at most 0.5%

Like Ni, Cu is an austenite forming element. It suppresses the formation of δ ferrite phase, and it is useful for guaranteeing the stability of texture, so it may be added as necessary. When Cu is added, the content thereof is preferably at least 0.01%. However, excessive addition thereof causes an extreme decrease in ductility during extended use at high temperatures, so the Cu content is at most 0.5%. The content is preferably less than 0.1%, and still more preferably less than 0.05%.

Cr: 1.8–2.8%

Cr is indispensable for guaranteeing oxidation resistance at high temperatures, high temperature corrosion resistance, and high temperature strength. However, excessive addition thereof leads to coarsening of carbides, and it ends up causing a decrease in high temperature strength as well as leading to a decrease in toughness. For these reasons, the Cr content is 1.8–2.8%.

V: 0.1–0.3%

V forms minute carbides or carbonitrides in steel, and it contributes to an increase in creep strength. However, excessive addition thereof increases the precipitation density of carbides within grains at the time of post weld heat treatment and increases the susceptibility to heat treatment cracks. Furthermore, it leads to rapid aggregation and coarsening of carbides during use at high temperatures and leads to a decrease in creep strength. For this reason, the V content is 0.1–0.3%.

Nb: 0.01–0.08%

Nb forms minute carbides or carbonitrides in steel and contributes to an increase in creep strength. For this reason, addition of at least 0.01% thereof is necessary. However, excessive addition thereof increases the precipitation density of carbides within grains during post weld heat treatment and increases the susceptibility to heat treatment cracks. Therefore, the Nb content is 0.01–0.08%.

Mo: 0.05–0.35%

Mo increases the solid solution strength of the steel matrix, and it precipitates as a carbide to increase creep strength. In addition, it has a strong affinity for P, and it decreases the amount of P which segregates at grain boundaries, so it contributes to a decrease in the susceptibility to weld heat treatment cracks. In order to obtain these effects, it is necessary for the content thereof to be at least 0.05%. However, excessive addition thereof decreases toughness after long periods of use, so its upper limit is 0.35%.

W: 1.2–1.8%

Like Mo, W performs solid solution hardening of the steel matrix and forms carbides to greatly increase creep strength. In order to obtain these effects, the content thereof must be at least 1.2%. On the other hand, it extremely strengthens the matrix, so when N is segregated at grain boundaries, the difference between the strength of the embrittled grain boundaries and the matrix becomes large, and heat treatment cracks are easily formed. In addition, excessive addition thereof leads to a decrease in toughness. Therefore, the upper limit thereon is 1.8%.

Al: at most 0.1%

Al is added as a deoxidizing agent for steel. However, excessive addition thereof decreases the cleanness of steel and decreases workability as well as leads to a decrease in high temperature strength. For this reason, the Al content is at most 0.1%. There is no particular lower limit thereon, but if the amount thereof is extremely low, the deoxidation of steel is inadequate. Therefore, the amount is preferably at least 0.0005%.

O (oxygen): at most 0.1%

O (oxygen) is an impurity in steel. It is present primarily as oxides which lead to a decrease in workability and in the strength and toughness of the base material. In addition, if it is present as oxides at grain boundaries, it may lead to a decrease in intercrystalline bonding strength and increase the susceptibility to heat treatment cracks. For this reason, the O content is at most 0.1%, preferably at most 0.06%, and still more preferably at most 0.03%. The oxygen content is preferably as low as possible, so there is no particular lower limit thereon, but extreme reductions therein lead to an increase in refining costs, so for actual production, the lower limit is generally on the order of 0.0005%.

Ti: 0.001–0.05%

Ti is indispensable for decreasing susceptibility to weld heat treatment cracks. Ti combines with N to form TiN and thereby decrease the amount of free N which reduces the intercrystalline bonding strength in weld heat affected zones. In addition, due to the pinning effect, it suppresses coarsening of crystal grains in weld heat affected zones due to weld heat cycles and it prevents the formation of heat treatment cracks. In order to obtain these effects, it is necessary for the content thereof to be at least 0.001%, and it is necessary for it to satisfy formula (1) relating it to B and N. However, excessive addition thereof leads to an extreme decrease in toughness, so the Ti content is at most 0.05%. More preferably, it is at most 0.04%.

B: 0–0.02%

Due to the presence of Ti in a steel according to the present invention, it is not particularly necessary to add B. However, B has a strong affinity for N, so like Ti, it forms nitrides and has the effect of decreasing the amount of free N at grain boundaries. In addition, the remaining B which does not combine with N is present as free B at grain boundaries and occupies segregation sites, so it suppresses segregation of grain boundary weakening elements such as N, it increases the intercrystalline bonding strength, and it prevents the generation of weld heat treatment cracks. These effects are marked when B is added in combination with Ti. Accordingly, it is necessary for the B content to satisfy formula (1). However, excessive addition thereof leads to embrittlement of the base material during extended use at high temperatures. Therefore, the upper limit on the B content is 0.02%. When it is added, the preferred content is 0.002–0.006%.

N: within a range satisfying formula (1)

N segregates as free N at grain boundaries at the time of steel manufacture or during post weld heat treatment, where it decreases intercrystalline bonding strength and is the cause of formation of weld heat treatment cracks. In order to prevent this, it is effective to fix N by adding Ti or Ti and B. In order to adequately fix N, it is necessary for the amount of N in the steel to satisfy formula (1):

$$[\%N] \leq [\%Ti] + 5[\%B] + 0.004 \quad (1)$$

Weld heat treatment cracking of a heat resistant steel of this invention is prevented by the combined effects of (i) a reduction in the amount of free N at grain boundaries by the addition of Ti and optionally B, (ii) preventing coarsening of crystal grains by the pinning effect of TiN, and (iii) increasing the intercrystalline bonding strength by free B. In order to obtain these effects, it is necessary for Ti, B, and N to satisfy formula (1).

An excessive amount of N leads to the formation of large amounts of nitrides and causes a decrease in toughness, whereas if the amount of N is too small, the above-described pinning effect of TiN cannot be adequately obtained. Accordingly, the N content is preferably greater than 0.005% up to 0.01%.

Average Crystal Grain Diameter: at most 110 μm

There are cases in which weld heat treatment cracks cannot be entirely prevented even if (i), (ii), and (iii) described above are satisfied. This is because weld heat treatment cracks are generated due to concentration of deformations due to thermal stresses at smooth grain boundaries grains of which are coarsened by weld heat cycles. In order to prevent this, it is necessary for the average crystal grain diameter in the weld heat affected zone to be at most 150 μm.

Figure 4:
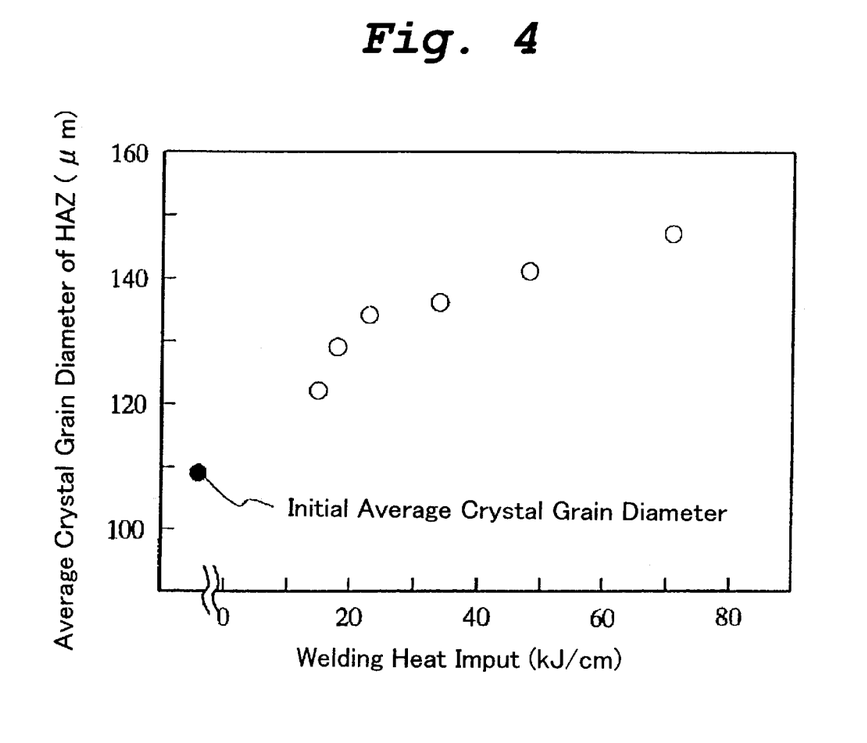
FIG. 4 is a graph showing the relationship between the welding heat input and the average crystal grain diameter in the weld heat affected zone.

FIG. 4 shows the relationship between the heat input during welding and the average crystal grain diameter in the weld heat affected zone. This figure shows the results of measurement of the average crystal grain diameter of the weld heat affected zone in a restraint weld test carried out using a steel plate with an average crystal grain diameter of 109 μm as a base material, with the heat input being varied using the submerged arc welding method. As is clear from this figure, the average crystal grain diameter in the weld heat affected zone can be restricted to at most 150 μm by making the average crystal grain diameter of the base material at most 110 μm and making the welding heat input at most 70 kJ/cm. The average crystal grain diameter in the weld heat affected zone is preferably as small as possible, so it is more preferable to limit the welding heat input to at most 50 kJ/cm.

The average crystal grain diameter of the above-described base material was obtained by performing heat treatment at 900–1100° C. for up to five hours during normalizing in the manufacture of the base material. The smaller is the average crystal grain diameter in the weld heat affected zone the better, and the smaller is the average crystal grain diameter in the base material, the smaller is the average crystal grain diameter in the weld heat affected zone. Therefore, in order to further improve the resistance to heat treatment cracks, the average crystal grain diameter of the base material is preferably at most 70 μm and is more preferably at most 45 μm. In order to obtain a texture with a minute crystal grain diameter in this range, it is preferable to perform heat treatment with tempering at 720–800° C., normalizing at 900–1100° C., and repeated tempering at 720–800° C.

The effects of the present invention can be obtained if the above-described ranges for alloying elements are satisfied, but in order to further decrease susceptibility to heat treatment cracks, the total amount of the unavoidable impurities Sn, As, Sb, and Pb is preferably at most 0.04%. In addition, in order to improve hot workability and to further decrease susceptibility to heat treatment cracks due to fixing of S, the steel may also include Ca: at most 0.02%, Mg: at most 0.02%, and REM (rare earth metals): at most 0.02%.

EXAMPLES

Steels having the chemical compositions shown in Tables 1–3 were prepared (containing Sn, As, Sb, and Pb as impurities in a total amount of at most 0.04%). Hot forging, hot rolling, and heat treatment were performed to manufacture steel plates with a thickness of 40 mm. The manufacturing conditions were selected so that the average crystal grain diameter of the base material was approximately 30–109 μm. For steels A7, A10, A18, A19, A23, A27–29, B3, B4, B9, and B15, the tempering temperature at the time of heat treatment was adjusted so as to increase the average crystal grain diameter. Steels A1–A31 are examples of steels according to the present invention, while steels B1–B16 are comparative steels outside the range of the present invention.

TABLE 1

| | Steel | \multicolumn{13}{c}{Chemical Composition (Bal: Fe, mass %)} |
|---|---|---|---|---|---|---|---|---|---|---|---|---|---|---|
| | | C | Si | Mn | P | S | Ni | Cu | Cr | V | Nb | Mo | W | Al |
| Present Invention | A1 | 0.06 | 0.12 | 0.34 | 0.009 | 0.006 | 0.02 | 0.01 | 2.26 | 0.22 | 0.04 | 0.28 | 1.54 | 0.018 |
| | A2 | 0.06 | 0.12 | 0.34 | 0.012 | 0.006 | 0.02 | 0.01 | 2.26 | 0.22 | 0.04 | 0.28 | 1.54 | 0.018 |
| | A3 | 0.08 | 0.05 | 1.20 | 0.012 | 0.004 | 0.08 | — | 2.20 | 0.18 | 0.05 | 0.05 | 1.80 | 0.013 |
| | A4 | 0.04 | 0.31 | 0.18 | 0.005 | 0.005 | 0.12 | 0.03 | 1.93 | 0.28 | 0.02 | 0.18 | 1.55 | 0.020 |
| | A5 | 0.06 | 0.33 | 0.06 | 0.018 | 0.005 | 0.01 | 0.22 | 2.51 | 0.13 | 0.05 | 0.22 | 1.60 | 0.015 |
| | A6 | 0.03 | 0.92 | 1.44 | 0.010 | 0.003 | 0.05 | 0.30 | 1.86 | 0.22 | 0.03 | 0.34 | 1.25 | 0.021 |
| | A7 | 0.03 | 0.92 | 1.44 | 0.026 | 0.015 | 0.05 | 0.30 | 1.86 | 0.22 | 0.03 | 0.34 | 1.25 | 0.021 |
| | A8 | 0.12 | 0.44 | 1.02 | 0.004 | 0.004 | 0.04 | 0.08 | 2.44 | 0.20 | 0.04 | 0.25 | 1.30 | 0.026 |
| | A9 | 0.07 | 0.62 | 0.21 | 0.015 | 0.003 | 0.03 | 0.05 | 2.49 | 0.19 | 0.05 | 0.33 | 1.44 | 0.010 |
| | A10 | 0.06 | 0.22 | 0.48 | 0.011 | 0.006 | 0.02 | 0.03 | 2.26 | 0.15 | 0.05 | 0.23 | 1.51 | 0.014 |
| | A11 | 0.06 | 0.25 | 0.21 | 0.007 | 0.003 | 0.05 | 0.02 | 2.23 | 0.22 | 0.05 | 0.26 | 1.61 | 0.005 |
| | A12 | 0.06 | 0.20 | 0.25 | 0.010 | 0.002 | 0.04 | 0.01 | 2.45 | 0.23 | 0.04 | 0.29 | 1.59 | 0.007 |
| | A13 | 0.05 | 0.30 | 0.29 | 0.011 | 0.004 | 0.04 | 0.03 | 2.25 | 0.21 | 0.05 | 0.11 | 1.60 | 0.006 |
| | A14 | 0.07 | 0.16 | 0.30 | 0.008 | 0.001 | 0.06 | 0.02 | 2.40 | 0.22 | 0.06 | 0.12 | 1.58 | 0.007 |
| | A15 | 0.06 | 0.23 | 0.28 | 0.009 | 0.003 | 0.03 | 0.04 | 2.26 | 0.24 | 0.05 | 0.10 | 1.62 | 0.005 |

| | Steel | Chemical Composition (Bal: Fe, mass %) | | | | Ti + 5B + 0.004 | Average Crystal Grain Diameter ($\mu$m) |
|---|---|---|---|---|---|---|---|
| | | O | Ti | N | B | | |
| Present Invention | A1 | 0.009 | 0.018 | 0.0091 | 0.0040 | 0.0420 | 36 |
| | A2 | 0.009 | 0.018 | 0.0092 | 0.0040 | 0.0420 | 40 |
| | A3 | 0.009 | 0.002 | 0.0191 | 0.0030 | 0.0210 | 33 |
| | A4 | 0.012 | 0.033 | 0.0113 | — | 0.0370 | 35 |
| | A5 | 0.010 | 0.021 | 0.0060 | 0.0081 | 0.0655 | 36 |
| | A6 | 0.006 | 0.003 | 0.0070 | — | 0.0070 | 34 |
| | A7 | 0.006 | 0.003 | 0.0070 | — | 0.0070 | 71 |
| | A8 | 0.005 | 0.001 | 0.0120 | 0.0022 | 0.0160 | 36 |
| | A9 | 0.012 | 0.007 | 0.0170 | 0.0021 | 0.0215 | 41 |
| | A10 | 0.009 | 0.003 | 0.0070 | 0.0013 | 0.0135 | 109 |
| | A11 | 0.008 | 0.009 | 0.0070 | 0.0051 | 0.0385 | 35 |
| | A12 | 0.007 | 0.010 | 0.0062 | 0.0035 | 0.0315 | 33 |
| | A13 | 0.009 | 0.008 | 0.0055 | 0.0045 | 0.0345 | 37 |
| | A14 | 0.006 | 0.012 | 0.0072 | 0.0035 | 0.0335 | 40 |
| | A15 | 0.008 | 0.005 | 0.0060 | 0.0049 | 0.0335 | 44 |

TABLE 2

| | Steel | \multicolumn{13}{c}{Chemical Composition (Bal: Fe, mass %)} |
|---|---|---|---|---|---|---|---|---|---|---|---|---|---|---|
| | | C | Si | Mn | P | S | Ni | Cu | Cr | V | Nb | Mo | W | Al |
| Present Invention | A16 | 0.06 | 0.24 | 0.11 | 0.012 | 0.004 | 0.04 | 0.01 | 2.31 | 0.20 | 0.05 | 0.15 | 1.60 | 0.006 |
| | A17 | 0.05 | 0.29 | 0.14 | 0.009 | 0.002 | 0.05 | 0.04 | 2.28 | 0.22 | 0.06 | 0.12 | 1.60 | 0.005 |
| | A18 | 0.05 | 0.30 | 0.34 | 0.008 | 0.002 | 0.05 | 0.08 | 2.05 | 0.20 | 0.03 | 0.05 | 1.44 | 0.006 |
| | A19 | 0.07 | 0.25 | 0.33 | 0.013 | 0.003 | 0.03 | 0.09 | 2.30 | 0.20 | 0.03 | 0.29 | 1.45 | 0.002 |
| | A20 | 0.06 | 0.15 | 0.34 | 0.010 | 0.003 | 0.05 | 0.05 | 2.60 | 0.24 | 0.07 | 0.30 | 1.63 | 0.004 |
| | A21 | 0.06 | 0.20 | 0.30 | 0.008 | 0.001 | 0.03 | 0.04 | 2.45 | 0.22 | 0.07 | 0.06 | 1.75 | 0.006 |
| | A22 | 0.06 | 0.18 | 0.29 | 0.014 | 0.001 | 0.05 | 0.09 | 2.57 | 0.22 | 0.05 | 0.14 | 1.74 | 0.003 |
| | A23 | 0.07 | 0.22 | 0.34 | 0.009 | 0.004 | 0.04 | 0.07 | 2.35 | 0.24 | 0.06 | 0.15 | 1.68 | 0.005 |
| | A24 | 0.06 | 0.20 | 0.33 | 0.008 | 0.003 | 0.05 | 0.09 | 2.40 | 0.19 | 0.07 | 0.25 | 1.55 | 0.006 |
| | A25 | 0.06 | 0.19 | 0.34 | 0.008 | 0.004 | 0.06 | 0.08 | 2.35 | 0.25 | 0.03 | 0.28 | 1.45 | 0.005 |
| | A26 | 0.07 | 0.25 | 0.29 | 0.008 | 0.002 | 0.07 | 0.09 | 2.24 | 0.21 | 0.08 | 0.30 | 1.59 | 0.004 |
| | A27 | 0.05 | 0.15 | 0.33 | 0.010 | 0.003 | 0.06 | 0.05 | 2.26 | 0.22 | 0.05 | 0.27 | 1.57 | 0.005 |
| | A28 | 0.07 | 0.25 | 0.34 | 0.007 | 0.004 | 0.06 | 0.04 | 2.25 | 0.22 | 0.06 | 0.15 | 1.60 | 0.005 |
| | A29 | 0.06 | 0.26 | 0.30 | 0.005 | 0.002 | 0.05 | 0.09 | 2.24 | 0.22 | 0.06 | 0.11 | 1.70 | 0.004 |
| | A30 | 0.06 | 0.30 | 0.24 | 0.010 | 0.002 | 0.06 | 0.08 | 2.25 | 0.24 | 0.05 | 0.05 | 1.75 | 0.006 |
| | A31 | 0.07 | 0.26 | 0.15 | 0.008 | 0.002 | 0.07 | 0.07 | 2.36 | 0.20 | 0.07 | 0.08 | 1.62 | 0.005 |

TABLE 2-continued

| | | Steel | Chemical Composition (Bal: Fe, mass %) | | | | Ti + 5B + 0.004 | Average Crystal Grain Diameter (μm) |
|---|---|---|---|---|---|---|---|---|
| | | | O | Ti | N | B | | |
| Present Invention | | A16 | 0.006 | 0.007 | 0.0057 | 0.0038 | 0.0300 | 38 |
| | | A17 | 0.007 | 0.008 | 0.0075 | 0.0036 | 0.0300 | 36 |
| | | A18 | 0.008 | 0.005 | 0.0056 | 0.0058 | 0.0380 | 75 |
| | | A19 | 0.007 | 0.006 | 0.0090 | 0.0040 | 0.0300 | 63 |
| | | A20 | 0.007 | 0.040 | 0.0051 | 0.0038 | 0.0630 | 42 |
| | | A21 | 0.006 | 0.026 | 0.0075 | 0.0045 | 0.0525 | 43 |
| | | A22 | 0.009 | 0.039 | 0.0065 | 0.0050 | 0.0680 | 38 |
| | | A23 | 0.005 | 0.015 | 0.0067 | 0.0035 | 0.0365 | 74 |
| | | A24 | 0.005 | 0.005 | 0.0055 | 0.0045 | 0.0315 | 40 |
| | | A25 | 0.008 | 0.001 | 0.0064 | 0.0058 | 0.0340 | 39 |
| | | A26 | 0.006 | 0.002 | 0.0069 | 0.0040 | 0.0260 | 38 |
| | | A27 | 0.007 | 0.005 | 0.0070 | 0.0030 | 0.0240 | 73 |
| | | A28 | 0.006 | 0.011 | 0.0057 | 0.0032 | 0.0310 | 70 |
| | | A29 | 0.007 | 0.020 | 0.0069 | 0.0041 | 0.0445 | 67 |
| | | A30 | 0.008 | 0.003 | 0.0090 | 0.0054 | 0.0340 | 55 |
| | | A31 | 0.006 | 0.001 | 0.0075 | 0.0048 | 0.0290 | 43 |

TABLE 3

| | Steel | Chemical Composition (Bal: Fe, mass %) | | | | | | | | | | | | |
|---|---|---|---|---|---|---|---|---|---|---|---|---|---|---|
| | | C | Si | Mn | P | S | Ni | Cu | Cr | V | Nb | Mo | W | Al |
| Compara-tive | B1 | 0.06 | 0.18 | 1.16 | 0.008 | 0.005 | 0.03 | 0.02 | 2.12 | 0.23 | 0.06 | 0.18 | 1.63 | 0.008 |
| | B2 | 0.11 | 0.35 | 0.71 | 0.015 | 0.003 | 0.05 | 0.07 | 1.98 | 0.18 | 0.04 | 0.23 | 1.48 | 0.015 |
| | B3 | 0.03 | 0.92 | 1.44 | 0.010 | 0.003 | 0.05 | 0.30 | 1.86 | 0.22 | 0.03 | 0.34 | 1.25 | 0.021 |
| | B4 | 0.03 | 0.92 | 1.44 | 0.020 | 0.003 | 0.05 | 0.30 | 1.86 | 0.22 | 0.03 | 0.05 | 1.25 | 0.021 |
| | B5 | 0.09 | 0.61 | 1.03 | 0.008 | 0.022 | 0.03 | 0.11 | 2.44 | 0.19 | 0.06 | 0.31 | 1.33 | 0.012 |
| | B6 | 0.05 | 0.11 | 0.45 | 0.015 | 0.002 | 0.03 | 0.03 | 2.23 | 0.18 | 0.03 | 0.19 | 1.63 | 0.016 |
| | B7 | 0.08 | 0.41 | 0.55 | 0.008 | 0.005 | 0.11 | 0.01 | 2.23 | 0.18 | 0.05 | 0.11 | 1.61 | 0.014 |
| | B8 | 0.06 | 0.33 | 0.48 | 0.012 | 0.005 | 0.01 | 0.02 | 2.24 | 0.21 | 0.05 | 0.19 | 1.33 | 0.022 |
| | B9 | 0.13 | 0.12 | 1.01 | 0.009 | 0.008 | 0.03 | — | 1.91 | 0.11 | 0.05 | 0.23 | 1.52 | 0.015 |
| | B10 | 0.05 | 0.25 | 0.92 | 0.004 | 0.003 | — | 0.05 | 2.66 | 0.14 | 0.08 | 0.16 | 1.54 | 0.017 |
| | B11 | 0.04 | 0.45 | 0.85 | 0.014 | 0.006 | 0.08 | 0.02 | 2.71 | 0.19 | 0.03 | 0.33 | 1.72 | 0.020 |
| | B12 | 0.06 | 0.16 | 0.16 | 0.014 | 0.012 | 0.04 | 0.03 | 1.98 | 0.26 | 0.04 | 0.19 | 1.60 | 0.016 |
| | B13 | 0.05 | 0.31 | 1.54 | 0.008 | 0.009 | 0.06 | 0.09 | 2.21 | 0.18 | 0.05 | 0.18 | 1.35 | 0.018 |
| | B14 | 0.03 | 0.23 | 0.31 | 0.005 | 0.011 | 0.12 | 0.03 | 2.09 | 0.21 | 0.06 | 0.23 | 1.48 | 0.022 |
| | B15 | 0.05 | 0.23 | 0.37 | 0.008 | 0.001 | 0.06 | 0.12 | 2.34 | 0.21 | 0.05 | 0.16 | 1.65 | 0.005 |
| | B16 | 0.07 | 0.24 | 0.39 | 0.014 | 0.004 | 0.07 | 0.14 | 2.24 | 0.26 | 0.06 | 0.18 | 1.64 | 0.006 |

| | | Steel | Chemical Composition (Bal: Fe, mass %) | | | | Ti + 5B + 0.004 | Average Crystal Grain Diameter (μm) |
|---|---|---|---|---|---|---|---|---|
| | | | O | Ti | N | B | | |
| Compara-tive | | B1 | 0.009 | 0.0020 | 0.0180 | 0.0021 | 0.0165 | 36 |
| | | B2 | 0.011 | — | 0.0110 | 0.0062 | 0.0350 | 38 |
| | | B3 | 0.006 | 0.0030 | 0.0070 | — | 0.0070 | 124 |
| | | B4 | 0.006 | 0.0030 | 0.0070 | — | 0.0070 | 140 |
| | | B5 | 0.007 | 0.0150 | 0.0200 | — | 0.0190 | 40 |
| | | B6 | 0.008 | 0.0530 | 0.0100 | 0.0010 | 0.0620 | 34 |
| | | B7 | 0.007 | — | 0.0150 | — | 0.0040 | 42 |
| | | B8 | 0.005 | 0.0005 | 0.0070 | — | 0.0045 | 44 |
| | | B9 | 0.006 | 0.0010 | 0.0120 | 0.0002 | 0.0060 | 62 |
| | | B10 | 0.005 | 0.0050 | 0.0180 | 0.0011 | 0.0145 | 38 |
| | | B11 | 0.009 | 0.0040 | 0.0100 | — | 0.0080 | 41 |
| | | B12 | 0.008 | 0.0020 | 0.0190 | 0.0013 | 0.0125 | 50 |
| | | B13 | 0.005 | 0.0030 | 0.0250 | 0.0012 | 0.0130 | 36 |
| | | B14 | 0.005 | 0.0020 | 0.0310 | 0.0031 | 0.0215 | 37 |
| | | B15 | 0.007 | 0.0006 | 0.0048 | — | 0.0046 | 78 |
| | | B16 | 0.007 | 0.0002 | 0.0045 | — | 0.0042 | 47 |

Figure 1:
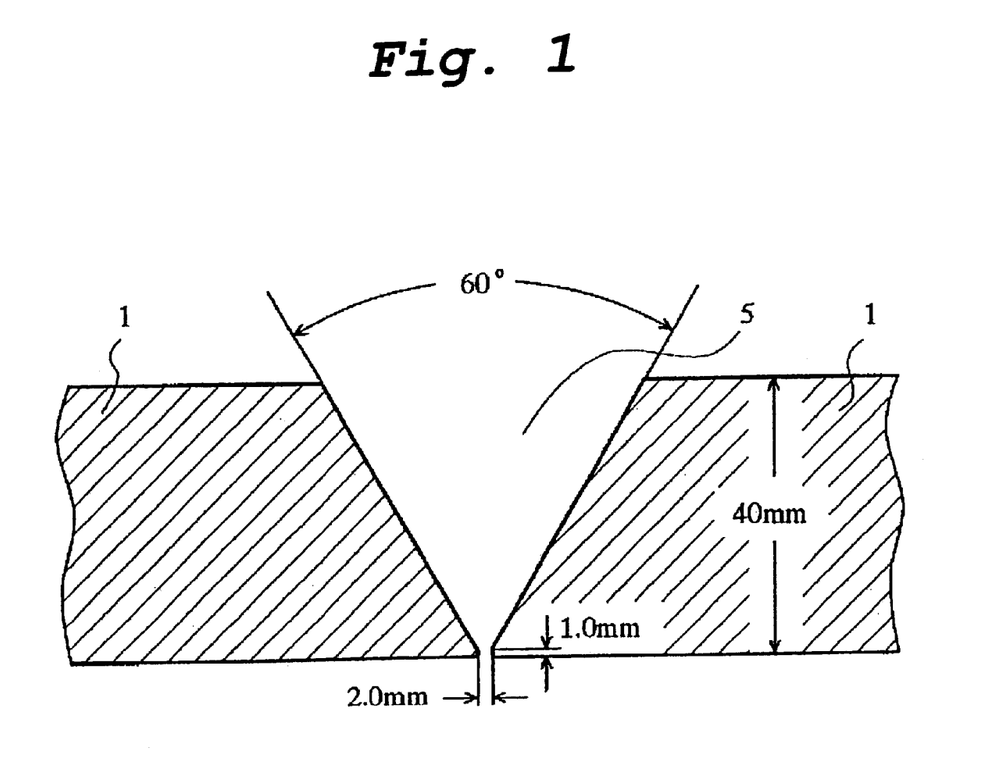
FIG. 1 is a vertical cross section of the opposing ends of two plates to be welded to each other.
Figure 2A:
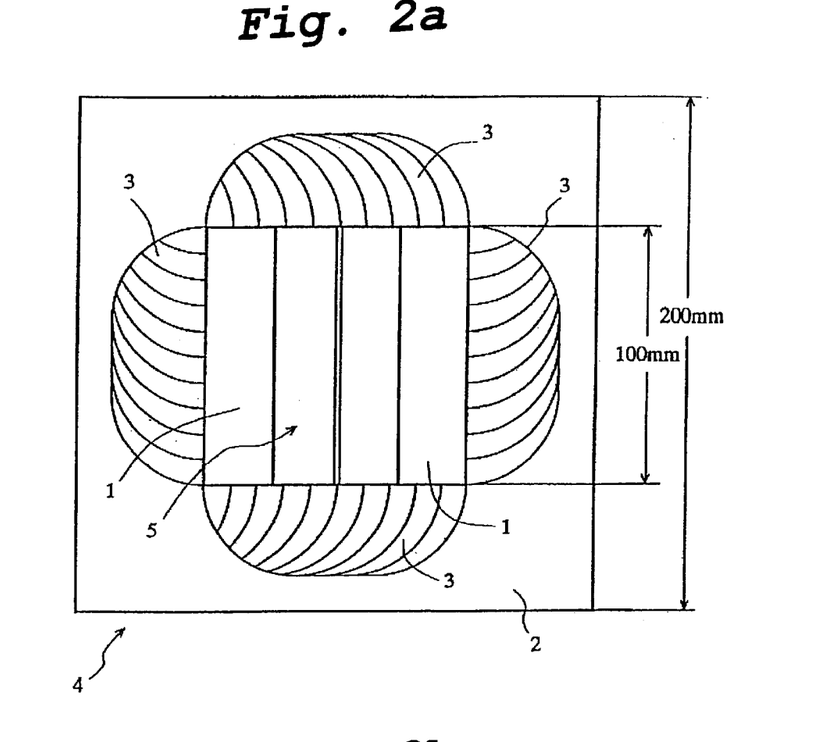
FIG. 2a is a plan view of a restraint welded body formed from the plates of FIG. 1.
Figure 2B:
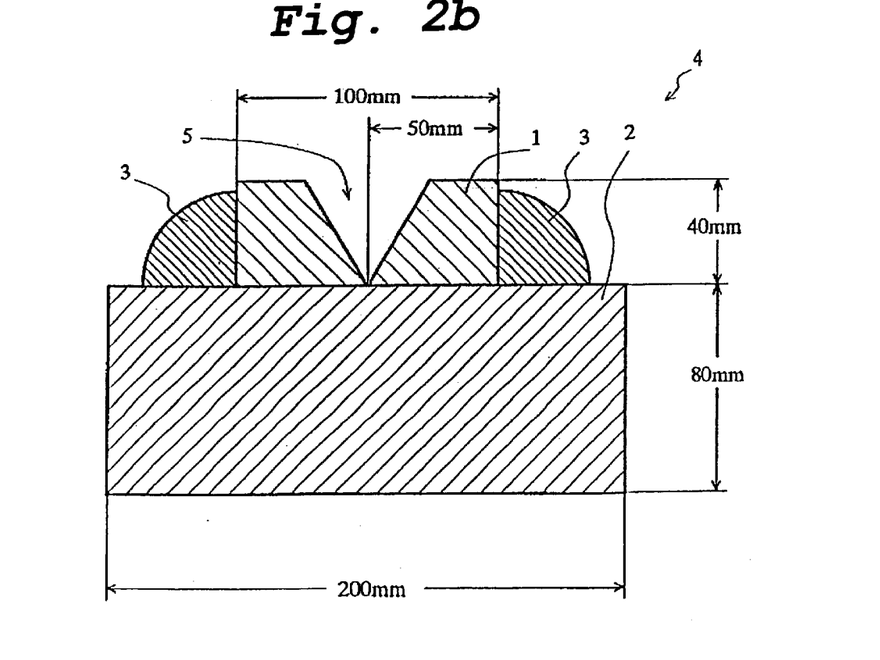
FIG. 2b is a vertical cross section of the restraint welded body.

From the steel plates which were obtained, rectangular flat plates 1 having a thickness of 40 mm, a width of 50 mm, and a length of 100 mm were cut, and a 30° bevel having the shape shown in FIG. 1 was formed in each plate 1 in one of the sides measuring 100 mm. Each bevel extended from the top surface to within approximately 1.0 mm of the bottom surface of the plate 1. Two of the plates 1 were then placed atop a support plate 2 having a thickness of 80 mm and measuring 200 mm long with the bevels facing each other in the manner shown in FIG. 1 to define a channel 5 with an angle of 60° between the bevels. The opposing faces of the plates 1 were slightly spaced from each other, such as by approximately 2.0 mm, at the lower ends of the bevels. Each plate 1 was then welded to the top surface of the support plate 2 by a weld 3 extending along three sides of the plate 1 to form a restraint welded body 4. FIG. 2a is a plan view of the restraint welded body 4, and FIG. 2b is a vertical cross section thereof.

In the channel 5 of the restraint welded body 4, a welding material having the chemical composition shown in Table 4 was used to form a multi-layer welded joint to weld the two plates 1 to each other by the TIG welding method (GTAW, welding heat input approximately 18 kJ/cm), the shielded metal arc welding method (SMAW, welding heat input approximately 25 kJ/cm), and the submerged arc welding method (SAW, welding heat input approximately 50/kJ/cm).

Each of the welding materials was in the form of a wire with an outer diameter of 1.2 mm manufactured by the usual processes of steel manufacture, hot working, and drawing.

After welding, post weld heat treatment was performed by heating to 715° C. and holding for 5 hours, after which a cross section of the welded portion was investigated at 5 locations, and the presence or absence of cracks in the weld heat affected zone was investigated. Steels for which no cracks were found for any of the cross sections at the 5 locations were evaluated as passing inspection (indicated by ○ in Tables 5–7), and those for which there was a crack in even one cross section were evaluated as failing inspection (indicated by ×).

Figure 3:
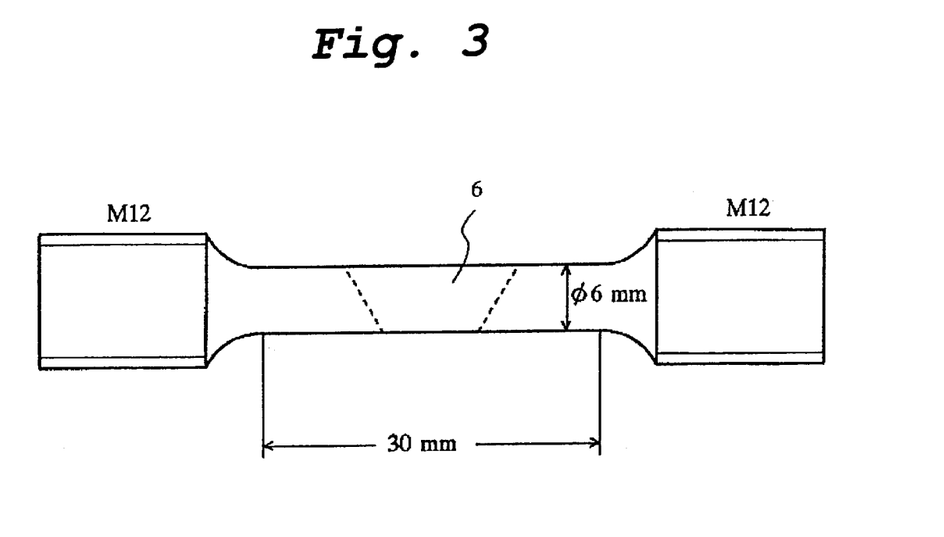
FIG. 3 is a plan view of a creep test piece cut from the welded body of FIG. 2.

A creep test piece and an impact test piece were cut from the test samples which passed inspection for cracks. FIG. 3 illustrates one of the creep test pieces, which were formed so that a welded portion 6 was at the center of the parallel region of the test piece. The parallel region had a uniform circular cross section with a diameter of approximately 6 mm and a length of approximately 30 mm. A creep test was carried out with a stress of 196 Mpa at a temperature of 550° C. The stress of 196 Mpa is a stress such that the creep failure life of the base material at 550° C. is approximately 3000 hours. Test pieces for which the time until failure was at least 2400 hours passed inspection.

Each impact test piece was a No. 4 impact test piece specified by JIS Z 2202, which was cut so that the weld heat affected zone was located in the notch of the test piece. Impact testing was carried out at 0° C. Test pieces for which the absorbed energy was at least 40 joules (J) passed inspection, and those having an absorbed energy below this value failed inspection.

The average crystal grain diameter of the base material and the weld heat affected zone was found by counting the number of crystal grains per unit length within the field of view (100×) of a light microscope.

The results of the various tests are shown in Tables 5–7. Symbols AJ1–AJ35 indicate welded joints formed from the steels according to the present invention, while symbols BJ1–BJ19 indicate welded joints formed from the comparative steels.

TABLE 4

| Welding Method | Chemical Composition of Welding Material (Bal: Fe, mass %) | | | | | | | | | | | | | |
|---|---|---|---|---|---|---|---|---|---|---|---|---|---|---|
| | C | Si | Mn | P | S | Ni | Cu | Cr | V | Nb | Mo | W | O | N |
| GTAW | 0.06 | 0.13 | 0.51 | 0.006 | 0001 | 0.79 | 0.02 | 2.25 | 0.29 | 0.04 | 0.12 | 1.54 | 0.007 | 0.007 |
| SMAW | 0.06 | 0.44 | 0.85 | 0.008 | 0.003 | 0.81 | 0.03 | 2.21 | 0.25 | 0.05 | 0.13 | 1.53 | 0.013 | 0.008 |
| SAW | 0.05 | 0.31 | 0.88 | 0.008 | 0.002 | 0.88 | 0.02 | 2.18 | 0.26 | 0.04 | 0.12 | 1.61 | 0.021 | 0.006 |

TABLE 5

| | Run No. | Steel | Welding Method | Average Crystal Grain Diameter of HAZ(μm) | Resistance to Heat Treatment Cracking (Number of Cross Sections where Cracking occurs/Inspected Number of Cross Sections) | Creep Failure Strength (hours before rupture) | Charpy Impact Value (Absorbed Energy, J) |
|---|---|---|---|---|---|---|---|
| Present Invention | AJ1 | A1 | GTAW | 58 | ○ (0/5) | 2671 | 48 |
| | AJ2 | A2 | GTAW | 66 | ○ (0/5) | 2563 | 51 |
| | AJ3 | A3 | SMAW | 76 | ○ (0/5) | 2732 | 60 |
| | AJ4 | A4 | GTAW | 56 | ○ (0/5) | 2493 | 42 |
| | AJ5 | A5 | SAW | 71 | ○ (0/5) | 2896 | 41 |
| | AJ6 | A6 | GTAW | 64 | ○ (0/5) | 2566 | 59 |
| | AJ7 | A6 | SMAW | 72 | ○ (0/5) | 2578 | 53 |
| | AJ8 | A6 | SAW | 81 | ○ (0/5) | 2793 | 44 |
| | AJ9 | A7 | GTAW | 83 | ○ (0/5) | 2638 | 58 |
| | AJ10 | A7 | SMAW | 95 | ○ (0/5) | 2588 | 55 |
| | AJ11 | A7 | SAW | 106 | ○ (0/5) | 2697 | 43 |
| | AJ12 | A8 | GTAW | 51 | ○ (0/5) | 2602 | 65 |
| | AJ13 | A9 | SMAW | 60 | ○ (0/5) | — | — |
| | AJ14 | A10 | SAW | 131 | ○ (0/5) | 2551 | 44 |
| | AJ15 | A11 | GTAW | 62 | ○ (0/5) | 2745 | 58 |
| | AJ16 | A12 | GTAW | 70 | ○ (0/5) | 2769 | 57 |
| | AJ17 | A13 | GTAW | 59 | ○ (0/5) | 2621 | 60 |

TABLE 6

| | Run No. | Steel | Welding Method | Average Crystal Grain Diameter of HAZ(μm) | Resistance to Heat Treatment Cracking (Number of Cross Sections where Cracking occurs/Inspected Number of Cross Sections) | Creep Failure Strength (hours before rupture) | Charpy Impact Value (Absorbed Energy, J) |
|---|---|---|---|---|---|---|---|
| Present Invention | AJ18 | A14 | SMAW | 68 | ○ (0/5) | 2605 | 56 |
| | AJ19 | A15 | SMAW | 75 | ○ (0/5) | 2667 | 54 |
| | AJ20 | A16 | SMAW | 66 | ○ (0/5) | 2675 | 55 |
| | AJ21 | A17 | GTAW | 55 | ○ (0/5) | 2654 | 54 |
| | AJ22 | A18 | GTAW | 91 | ○ (0/5) | 2559 | 62 |
| | AJ23 | A19 | GTAW | 78 | ○ (0/5) | 2546 | 53 |
| | AJ24 | A20 | SAW | 74 | ○ (0/5) | 2468 | 50 |
| | AJ25 | A21 | SAW | 78 | ○ (0/5) | 2531 | 47 |
| | AJ26 | A22 | SAW | 75 | ○ (0/5) | 2506 | 46 |
| | AJ27 | A23 | GTAW | 95 | ○ (0/5) | 2438 | 57 |
| | AJ28 | A24 | GTAW | 59 | ○ (0/5) | 2465 | 59 |
| | AJ29 | A25 | SAW | 74 | ○ (0/5) | 2564 | 46 |
| | AJ30 | A26 | SAW | 76 | ○ (0/5) | 2641 | 46 |
| | AJ31 | A27 | SMAW | 106 | ○ (0/5) | 2421 | 53 |
| | AJ32 | A28 | SMAW | 98 | ○ (0/5) | 2409 | 55 |
| | AJ33 | A29 | GTAW | 85 | ○ (0/5) | 2567 | 58 |
| | AJ34 | A30 | GTAW | 73 | ○ (0/5) | 2648 | 57 |
| | AJ35 | A31 | GTAW | 64 | ○ (0/5) | 2905 | 58 |

TABLE 7

| | Run No. | Steel | Welding Method | Average Crystal Grain Diameter of HAZ(μm) | Resistance to Heat Treatment Cracking (Number of Cross Sections where Cracking occurs/Inspected Number of Cross Sections) | Creep Failure Strength (hours before rupture) | Charpy Impact Value (Absorbed Energy, J) |
|---|---|---|---|---|---|---|---|
| Comparative | BJ1 | B1 | GTAW | 59 | X (5/5) | — | — |
| | BJ2 | B2 | GTAW | 152 | X (3/5) | — | — |
| | BJ3 | B3 | SMAW | 150 | X (4/5) | — | — |
| | BJ4 | B3 | SAW | 157 | X (5/5) | — | — |
| | BJ5 | B4 | GTAW | 156 | X (4/5) | — | — |
| | BJ6 | B4 | SMAW | 164 | X (5/5) | — | — |
| | BJ7 | B4 | SAW | 173 | X (5/5) | — | — |
| | BJ8 | B5 | GTAW | 59 | X (2/5) | — | — |
| | BJ9 | B6 | GTAW | 52 | ○ (0/5) | 2531 | 11 |
| | BJ10 | B7 | GTAW | 152 | X (5/5) | — | — |
| | BJ11 | B8 | GTAW | 64 | X (3/5) | — | — |
| | BJ12 | B9 | GTAW | 85 | X (4/5) | — | — |
| | BJ13 | B10 | GTAW | 61 | X (2/5) | — | — |
| | BJ14 | B11 | SMAW | 71 | X (2/5) | — | — |
| | BJ15 | B12 | GTAW | 69 | X (3/5) | — | — |
| | BJ16 | B13 | SAW | 76 | X (4/5) | — | — |
| | BJ17 | B14 | GTAW | 55 | X (4/5) | — | — |
| | BJ18 | B15 | GTAW | 121 | X (3/5) | — | — |
| | BJ19 | B16 | SMAW | 97 | X (4/5) | — | — |

Steels A1–A31 according to the present invention each had a Ti content of 0.001–0.033% and an N content of less than [%Ti]+5[%B]+0.004, and they had an average crystal grain diameter within the range of 33–109 μm. Therefore, as is clear from Table 5 and Table 6, in welded joints AJ1–AJ35 using steels of the present invention, regardless of the welding method, no cracks were detected in the weld heat affected zone. In addition, the creep failure strength was in a range for the time until failure of 2493–2896 hours, and the Charpy impact test strength was in the range of 41–65 joules, both of which are satisfactory values.

In contrast, for comparative steel B1, the N content was 0.018%, which was larger than [%Ti]+5[%B]+0.004. Namely, formula (1) was not satisfied. As a result, as is clear from Table 7, cracks were detected in the weld heat affected zone in joint BJ1. For comparative steel B2, the average crystal grain diameter of the base material was 38 μm. However, as it did not contain Ti, when it was used to form a welded joint (joint BJ2), the average crystal grain diameter in the weld heat affected zone was 152 μm, and cracks were detected in the weld heat affected zone.

For comparative steels B3 and B4, the average crystal grain diameters had large values of 124 μm and 140 μm. Therefore, welded joints BJ3–BJ7 had a large average crystal grain diameter in the weld heat affected zone of 154–173 μm, and cracks were detected in the weld heat affected zone.

Comparative steel B5 had an N content of 0.020%, while [%Ti]+5[%B]+0.004 came to 0.019%, so it did not satisfy formula (1). Therefore, cracks were detected in the weld heat affected zone of welded joint BJ8.

Comparative steel B6 satisfied formula (1), so cracks were not formed, but the Ti content of 0.053% was excessive, so when it was made into a welded joint (joint BJ9), the absorbed energy in the Charpy impact test was a low value of 11 joules.

Comparative steel B7 did not contain Ti and B, so for joint BJ10, cracks were detected in the weld heat affected zone.

Comparative steels B8–B14 had a higher N content than given by [%Ti]+5[%B]+0.004, so they did not satisfy formula (1). Therefore, cracks were detected in the weld heat affected zone of each of joints BJ11–BJ17.

Comparative steels B15 and B16 each had an N content greater than [%Ti]+5[%B]+0.004, and the Ti content was smaller than the level of 0.001% necessary to exhibit a pinning effect. Accordingly, cracks were detected in each of joints BJ18 and BJ19.

As is clear from the above-described test results, due to the chemical content and the small average crystal grain diameter of a steel according to the present invention, the steel can be welded without the formation of weld heat treatment cracks to form welded joints having good creep strength and impact characteristics.

What is claimed is:

1. A high strength, low alloy, heat resistant steel having an average crystal grain diameter of at most 110 μm and consisting essentially of, in mass %:

| | |
|---|---|
| C: 0.03–0.15% | Si: at most 1% |
| Mn: at most 2% | P: at most 0.03% |
| S: at most 0.03% | Ni: at most 0.5% |
| Cu: 0–0.1% | Cr: 1.8–2.8% |
| V: 0.1–0.3% | Nb: 0.01–0.08% |
| Mo: 0.05–0.35% | W: 1.2–1.8% |
| Ti: 0.001–0.05% | B: 0–0.02% |
| Al: at most 0.1% | O: at most 0.1% |
| N: in an amount satisfying the formula (1) | |

$$[\%N] \leq [\%Ti] + 5[\%B] + 0.004 \quad (1)$$

and a remainder of Fe and unavoidable impurities.

2. A high strength, low alloy, heat resistant steel as claimed in claim 1 including less than 0.35 mass % of Mn.

3. A high strength, low alloy, heat resistant steel as claimed in claim 1 including less than 0.05 mass % of Cu and less than 0.30 mass % of Mn.

4. A high strength, low alloy, heat resistant steel as claimed in claim 1 including greater than 0.005 mass % and at most 0.01 mass % of N, and 0.001–0.04 mass % of Ti.

5. A high strength, low alloy, heat resistant steel as claimed in claim 1 including 0.002–0.006 mass % of B.

6. A high strength, low alloy, heat resistant steel having an average crystal grain diameter of at most 110 μm and consisting essentially of, in mass %:

| | |
|---|---|
| C: 0.03–0.15% | Si: at most 1% |
| Mn: less than 0.35 mass % | P: at most 0.03% |
| S: at most 0.03% | Ni: at most 0.5% |
| Cu: less than 0.1 mass % | Cr: 1.8–2.8% |
| V: 0.1–0.3% | Nb: 0.01–0.08% |
| Mo: 0.05–0.35% | W: 1.2–1.8% |
| Ti: 0.001–0.05% | B: 0–0.02% |
| Al: at most 0.1% | O: at most 0.1% |
| N: in an amount satisfying the formula (1) | |

$$[\%N] \leq [\%Ti] + 5[\%B] + 0.004 \quad (1)$$

and a remainder of Fe and unavoidable impurities.

7. A high strength, low alloy, heat resistant steel as claimed in claim 6 including greater than 0.005 mass % and at most 0.01 mass % of N, and 0.001–0.04 mass % of Ti.

8. A high strength, low alloy, heat resistant steel as claimed in claim 6, including 0.002–0.006 mass % of B.

9. A high strength, low alloy, heat resistant steel having an average crystal grain diameter of at most 110 μm and consisting essentially of, in mass %:

| | |
|---|---|
| C: 0.03–0.15% | Si: at most 1% |
| Mn: less than 0.30 mass % | P: at most 0.03% |
| S: at most 0.03% | Ni: at most 0.5% |
| Cu: less than 0.05 mass % | Cr: 1.8–2.8% |
| V: 0.1–0.3% | Nb: 0.01–0.08% |
| Mo: 0.05–0.35% | W: 1.2–1.8% |
| Ti: 0.001–0.05% | B: 0–0.02% |
| Al: at most 0.1% | O: at most 0.1% |
| N: in an amount satisfying the formula (1) | |

$$[\%N] \leq [\%Ti] + 5[\%B] + 0.004 \quad (1)$$

and a remainder of Fe and unavoidable impurities.

10. A high strength, low alloy, heat resistant steel as claimed in claim 9 including greater than 0.005 mass % and at most 0.01 mass % of N, and 0.001–0.04 mass % of Ti.

11. A high strength, low alloy, heat resistant steel as claimed in claim 9 including 0.002–0.006 mass % of B.

\* \* \* \* \*